(12) United States Patent
Bulat

(10) Patent No.: US 11,525,396 B2
(45) Date of Patent: Dec. 13, 2022

(54) COMBUSTOR APPARATUS WITH BLEED ARRANGEMENT AND RESONATOR WITH COOLING FLOW AND METHOD OF OPERATING COMBUSTOR APPARATUS

(71) Applicant: Siemens Energy Global GmbH & Co. KG, Munich (DE)

(72) Inventor: Ghenadie Bulat, Lincoln (GB)

(73) Assignee: Siemens Energy Global GmbH & Co. KG, Munich (DE)

( * ) Notice: Subject to any disclaimer, the term of this patent is extended or adjusted under 35 U.S.C. 154(b) by 149 days.

(21) Appl. No.: 16/631,224

(22) PCT Filed: Jul. 18, 2018

(86) PCT No.: PCT/EP2018/069565
§ 371 (c)(1),
(2) Date: Jan. 15, 2020

(87) PCT Pub. No.: WO2019/020474
PCT Pub. Date: Jan. 31, 2019

(65) Prior Publication Data
US 2020/0141577 A1 May 7, 2020

(30) Foreign Application Priority Data
Jul. 25, 2017 (EP) .................................... 17182951

(51) Int. Cl.
*F02C 7/045* (2006.01)
*F23M 20/00* (2014.01)
(Continued)

(52) U.S. Cl.
CPC ........... *F02C 7/045* (2013.01); *F23M 20/005* (2015.01); *F23R 3/286* (2013.01); *F05B 2260/96* (2013.01);
(Continued)

(58) Field of Classification Search
CPC .. F23R 2900/00013; F23R 2900/00014; F02C 9/18; F02C 9/50; F02C 9/52; F02C 7/18; F02C 6/08; F02C 3/13
See application file for complete search history.

(56) References Cited

U.S. PATENT DOCUMENTS 6,089,025 A * 7/2000 Tekriwal ................... F23R 3/16
60/737
10,513,984 B2 * 12/2019 Kim .......................... F02C 3/14
(Continued)

FOREIGN PATENT DOCUMENTS

EP 1381025 A2 1/2004
EP 1557609 A1 * 7/2005 ........... F23M 20/005
(Continued)

OTHER PUBLICATIONS

International search report and written opinion dated Aug. 24, 2018 for corresponding PCT/EP2018/069565.

*Primary Examiner* — William H Rodriguez
*Assistant Examiner* — Kyle Robert Thomas

(57) ABSTRACT

A gas turbine engine includes combustion apparatus defining a volume, a compressor, a cooling air supply feed from the compressor, and a Helmholtz resonator. The Helmholtz resonator has a neck and a chamber having an attenuation volume and which is in fluid communication with the attenuation volume, the cooling air supply feed is connected to the Helmholtz resonator and includes a valve arrangement. In a first engine operating condition, the valve arrangement is closed and the Helmholtz resonator attenuates acoustic frequencies in a first range and, in a second engine operating condition, the valve arrangement is open whereby cooling air purges the attenuation volume and the Helmholtz resonator attenuates acoustic frequencies in a second range.

19 Claims, 3 Drawing Sheets

(51) Int. Cl.
*F23R 3/28* (2006.01)
*F23R 3/00* (2006.01)

(52) U.S. Cl.
CPC .... *F05D 2240/35* (2013.01); *F05D 2260/963* (2013.01); *F05D 2260/964* (2013.01); *F23R 3/002* (2013.01); *F23R 2900/00013* (2013.01); *F23R 2900/00014* (2013.01)

(56) References Cited

U.S. PATENT DOCUMENTS

| | | | | |
|---|---|---|---|---|
| 2002/0000343 | A1* | 1/2002 | Paschereit | F01N 1/02 181/229 |
| 2010/0313568 | A1* | 12/2010 | Davis, Jr. | F23M 20/005 60/725 |
| 2012/0204534 | A1* | 8/2012 | Kenyon | F23R 7/00 60/249 |
| 2012/0228050 | A1 | 9/2012 | Bulat | |
| 2013/0025282 | A1 | 1/2013 | Bulat | |
| 2014/0083102 | A1* | 3/2014 | Miura | F23D 14/82 60/737 |
| 2014/0196468 | A1* | 7/2014 | Bulat | F02C 7/24 60/779 |
| 2015/0082794 | A1* | 3/2015 | Schilp | F02K 1/827 60/722 |
| 2017/0058780 | A1* | 3/2017 | Kim | F01D 25/04 |
| 2017/0176009 | A1* | 6/2017 | Szwedowicz | F23M 20/005 |

FOREIGN PATENT DOCUMENTS

| | | | |
|---|---|---|---|
| EP | 1557609 | A1 | 7/2005 |
| GB | 2288660 | A | 10/1995 |
| JP | 2005048992 | A | 2/2005 |

\* cited by examiner

COMBUSTOR APPARATUS WITH BLEED ARRANGEMENT AND RESONATOR WITH COOLING FLOW AND METHOD OF OPERATING COMBUSTOR APPARATUS

CROSS REFERENCE TO RELATED APPLICATIONS

This application is the US National Stage of International Application No. PCT/EP2018/069565 filed 18 Jul. 2018, and claims the benefit thereof. The International Application claims the benefit of European Application No. EP17182951 filed 25 Jul. 2017. All of the applications are incorporated by reference herein in their entirety.

FIELD OF THE INVENTION

The present invention relates to a method of operating and an arrangement of a combustion apparatus of a gas turbine engine and particularly to a combustion apparatus having a Helmholtz resonator for the attenuation of combustion dynamics across a broad range of combustion dynamic frequencies. More particularly the Helmholtz resonator is a variable-frequency Helmholtz resonator.

BACKGROUND

Dry Low Emission (DLE) combustion systems are known to be reliable in producing low NOx and having compact flames. However, most DLE combustion systems are prone to combustion dynamics, such as acoustic fluctuations, because they operate with a lean mixture of fuel and air in order to achieve low NOx emissions. Combustion dynamics can arise as a result of flame excitation, aerodynamic induced excitation or insufficient damping.

Conventionally, acoustic damping of the critical frequency is performed. Known damping devices, such as Helmholtz resonators and perforated liners, are placed directly on the combustion chamber, inside/outside centre casings or on bleed pipes. The location of the damping devices on the combustion system is selected based on the maxima of the pressure anti-node of a specific acoustic frequency to be damped. Helmholtz resonators are known to be very effective at damping specific acoustic frequencies experienced by the combustion system. However, conventional Helmholtz resonators can only target a single operating condition of the engine or combustion system, e.g. a full load design point, where the acoustic resonance is at its worst or for the longest period of time.

In these conventional damped combustion systems, when the demanded load is altered from 100% or maximum output to say 50-70% maximum output, the combustion system can be prone to a different acoustic frequency because the temperature, pressure and mass flow within the combustion system has changed. This different acoustic frequency can be problematic where the acoustic frequency of the combustor has shifted outside the range of the damping device's resonating frequency range. To overcome this problem a second set of Helmholtz resonators, tuned to the different acoustic frequency, can be implemented. However, this approach increases complexity, parts count, cost and can be compromised by geometric installation constraints.

One alternative solution is present in WO2011/128,156 which discloses a resonator device for damping a pressure oscillation within a combustion chamber, the resonator device comprising: a container filled with a gas; an opening in the container; and a heating element adapted to generate a flame. The flame is arranged to heat the gas within the container. The resonator device is comprised in a combustion arrangement, further comprising a combustion chamber for defining a combustion space for burning fuel. The container is connected to the combustion chamber such that an inside of the container is in communication with the combustion space via the opening. The resonator device has a resonance frequency equal to a pressure oscillation frequency within the combustion chamber under normal load conditions.

EP1 557 609 A1 discloses a Helmholtz resonator, which has a resonating volume in connection with the combustion chamber volume via a connective opening. The device has the unique characteristic that an adjustable flow of cooling air can be introduced into the resonating volume and connective opening. As opposed to other approaches for tuning a Helmholtz resonator, the present invention allows for the first time the resonance frequency of the Helmholtz resonator to be adjusted by a dynamic flow of cooling air. A method for damping thermoacoustic oscillations in a combustion chamber is also given, wherein a flow of cooling air is adjusted in order to modify the resonator characteristics of the Helmholtz resonator fluidically connected to the combustion chamber.

SUMMARY OF INVENTION

One objective of the present combustion apparatus is to attenuate more than one frequency range of combustion acoustics. Another objective is to identify and damp or attenuate combustor acoustic amplitude peaks at different engine operating loads. Another objective is to automatically control the attenuation frequency of the Helmholtz resonator to match shifts of the combustion dynamics peaks. Another objective is to minimise parts count. Another objective is to extend the engine's operating envelope for dry low-emission operation and especially at part-load. Another objective is to prevent resonance in a bleed arrangement of the combustor and prevent undesirable combustion dynamics. In this way natural frequencies of the bleed arrangement can be prevented from causing destructive combustion dynamics and prevent combustion flame instability.

For these and other objectives and advantages there is provided a gas turbine engine comprising combustion apparatus defining a volume, a compressor, a cooling air supply feed from the compressor, a bleed arrangement comprising a conduit, the conduit is connected to the volume such that fluid can be bled from the volume through the conduit, a Helmholtz resonator. The Helmholtz resonator comprises a neck and a chamber having an attenuation volume and which is in fluid communication with the volume. The Helmholtz resonator is connected to the conduit such that fluid in the conduit can pass therebetween. The cooling air supply feed is connected to the Helmholtz resonator and comprises a valve arrangement. The valve arrangement is configured such that in a first engine operating condition the valve arrangement is closed and the Helmholtz resonator attenuates acoustic frequencies in a first range and in a second engine operating condition the valve arrangement is open whereby cooling air purges the attenuation volume and the Helmholtz resonator attenuates acoustic frequencies in a second range.

The first engine operating condition may be at a different load output than the second engine operating condition. Advantageously the first engine operating condition is at a higher output than the second engine operating condition.

During the first engine operating condition the Helmholtz resonator may be at a higher temperature than at the second engine operating condition.

The gas turbine engine further comprises an engine control unit and a combustion dynamics probe associated with the combustion apparatus. The engine control unit is connected to the combustion dynamics probe and the valve arrangement to command the valve arrangement to open and close dependent on the acoustic frequency of the combustion apparatus.

The gas turbine engine further comprises an annular combustor apparatus. Alternatively, the gas turbine engine further comprises an annular array of combustor apparatus each having at least one Helmholtz resonator.

Each Helmholtz resonator may be connected to its own valve arrangement and opened or closed independently of the other valve arrangements.

Each Helmholtz resonator may be connected to a single valve arrangement.

The cooling air supply feed may comprise a cooler to cool the air supplied to the Helmholtz resonator(s).

In the first range the acoustic frequencies may be between 120 Hz and 160 Hz, advantageously between 132 Hz and 142 Hz and more advantageously at approximately 137 Hz. In the second range the acoustic frequencies may be between 75 Hz and 115 Hz, advantageously between 90 Hz and 100 Hz and more advantageously at approximately 95 Hz.

In the first engine operating condition the temperature may be between 590K and 790K, advantageously 640K and 730K or more advantageously approximately 690K. In the second engine operating condition the temperature may be between 300K and 400K, advantageously 325K and 375K and more advantageously 350K.

In the first engine operating condition the engine may be operating at at least 90% of its maximum output. In the second engine operating condition the engine may be operating between 50% and 75% of its maximum output.

The geometry of the neck and the chamber of the Helmholtz resonator may be set to attenuate acoustic frequencies in a first range.

The bleed arrangement may further comprises a valve and an exhaust ducting, the valve is situated between the conduit and the exhaust ducting.

The exhaust ducting may be connected to any one or more of an inlet of the compressor, an inlet of the gas turbine engine, an exhaust duct of the gas turbine engine.

In another aspect of the present invention there is provided a method of operating a gas turbine engine according to any one of the above paragraphs. The method comprising the steps of detecting a change in temperature in the combustion apparatus whereby the acoustic frequency to be attenuated at the first engine operating condition is outside the range of the Helmholtz resonator and opening the valve arrangement and supplying cooling air the Helmholtz resonator such that it attenuates acoustic frequencies in the second range.

The method may comprise the steps of detecting a change in temperature in the combustion apparatus whereby the acoustic frequency to be attenuated at the second engine operating condition is outside the range of the Helmholtz resonator being supplied with cooling air and closing the valve arrangement to reduce or stop the supply of cooling air to the Helmholtz resonator such that it attenuates acoustic frequencies in the first range.

The method may comprise the step of bleeding a fluid from the volume. Controlling bleeding the fluid from the combustor may be achieved by operation of the valve between an open and a closed position.

BRIEF DESCRIPTION OF THE DRAWINGS

The above mentioned attributes and other features and advantages of this invention and the manner of attaining them will become more apparent and the invention itself will be better understood by reference to the following description of embodiments of the invention taken in conjunction with the accompanying drawings, wherein.

DETAILED DESCRIPTION OF INVENTION

Figure 1:
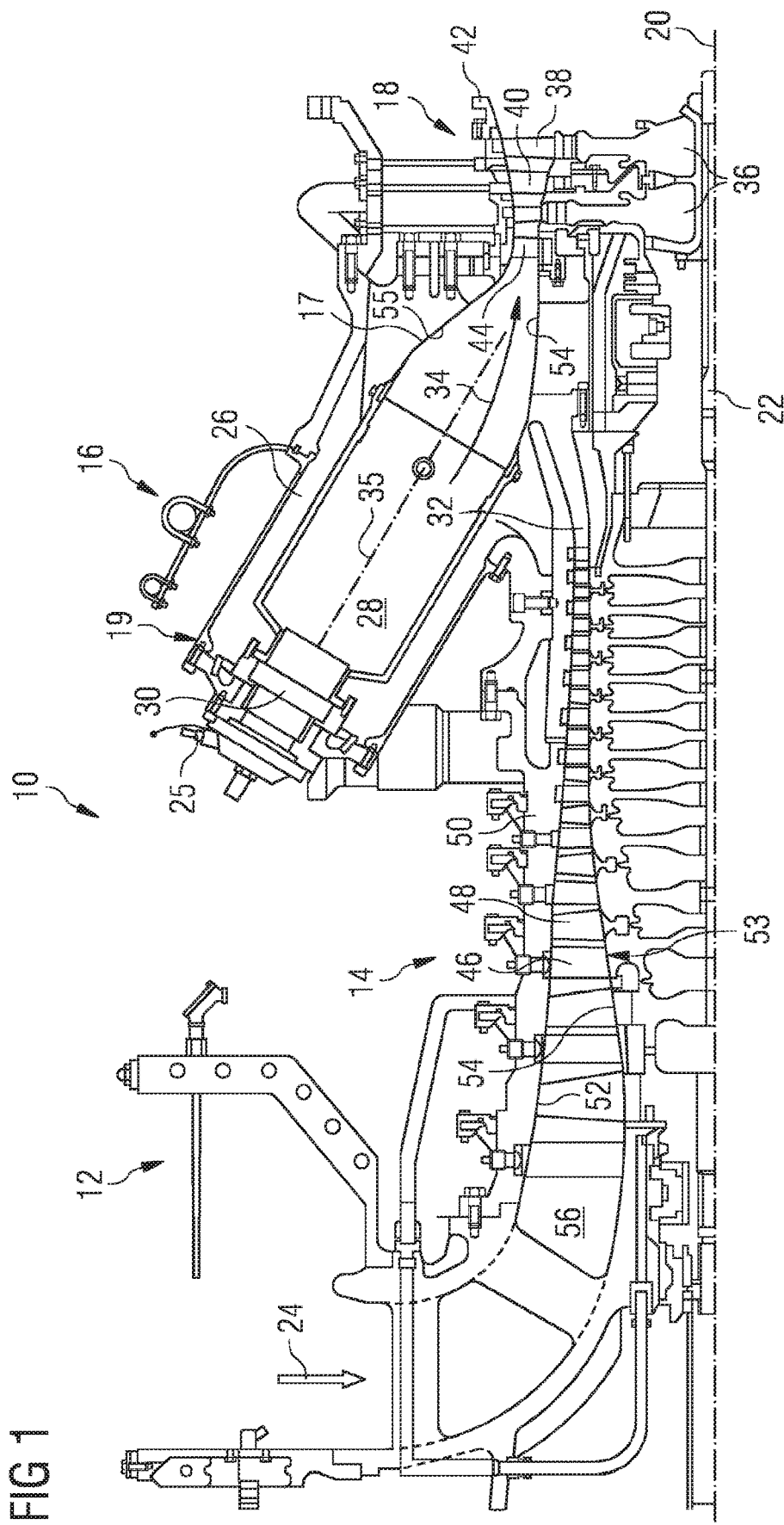
FIG. 1 shows part of a turbine engine in a sectional view and in which a combustion apparatus having a variable frequency attenuating Helmholtz resonator may be incorporated.

FIG. 1 shows an example of a gas turbine engine 10 in a sectional view. The gas turbine engine 10 comprises, in flow series, an inlet 12, a compressor or compressor section 14, a combustor section 16, a turbine section 18 and an exhaust duct (not shown) which are generally arranged in flow series and generally about and in the direction of a longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 14.

In operation of the gas turbine engine 10, air 24, which is taken in through the air inlet 12 is compressed by the compressor section 14 and delivered to the combustion section or burner section 16. The burner section 16 comprises a longitudinal axis 35 of the burner, a burner plenum 26, one or more combustion chambers 28 and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channelled through the combustion chamber 28 to the turbine section 18 via a transition duct 17.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. The cannular combustor section arrangement 16 is more generally referred to as combustion apparatus 16 and which is intended to comprise other combustor arrangements such as an annular combustor. An annular array of transition duct outlets form an annulus for channelling the combustion gases to the turbine 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 46. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operation conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48.

The present technique is described with reference to the above exemplary turbine engine having a single shaft or spool connecting a single, multi-stage compressor and a single, one or more stage turbine. However, it should be appreciated that the present technique is equally applicable to two or three shaft engines and which can be used for industrial, aero or marine applications.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine.

Figure 2:
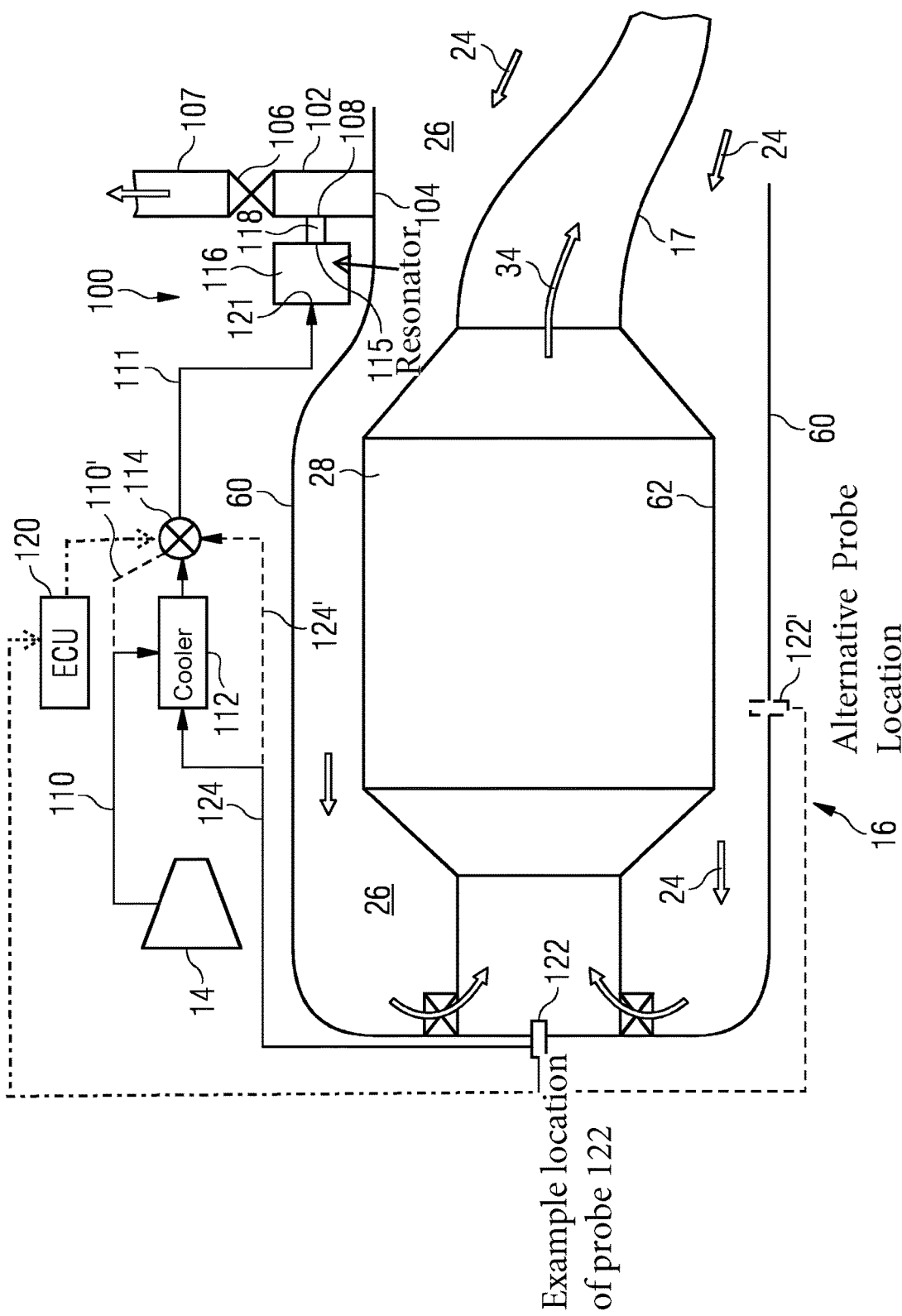
FIG. 2 shows a schematic outline of the combustion apparatus having further equipment associated to enable the variable frequency attenuating Helmholtz resonator.

FIG. 2 shows the combustion apparatus 16 in sectional and schematic view. The burner plenum 26 is defined between a combustor casing 60 and a combustor chamber wall 62. The burner plenum 26 defines a volume of the combustion apparatus 16. A bleed arrangement comprises a conduit 102 that is connected to the combustor casing 60 and forms an inlet 104 such that fluid can pass between the plenum or volume 26 and the conduit 102. A Helmholtz resonator 100 is connected to the conduit 102 via an opening 108 such that fluid and acoustic pressure waves in the conduit 102 can pass into and out of the Helmholtz resonator 100. The bleed arrangement further comprises a valve 106 positioned between the conduit 102 and an exhaust ducting 107 to regulate fluid passing through the conduit 102 and through the exhaust ducting 107. The opening 108 of the Helmholtz resonator 100 is positioned on and in fluid communication with the conduit 102 and between the inlet 104 and the valve 106.

The exhaust ducting 107 is connected to an inlet region of the compressor 14 and/or the inlet 12. Bleeding fluid from volume or plenum 26 through the conduit 102, the valve 106 and then the exhaust ducting 107 to either or even both the compressor 14 or inlet 12 can improve emissions of the gas turbine because flame stability is maintained and a more constant temperature of the flame is achieved. Advantageously, such bleeding can provide some energy recovery particularly in transient engine operating conditions or at part load output of the engine. Further, bleeding to the engine's inlet can be advantageous in particularly cold ambient conditions to prevent icing and improve compressor efficiency. In addition or alternatively, the bleed arrangement may comprise the exhaust duct 107 being connected to the engine's exhaust although no energy recovery is possible, this bleed does allow improved combustion stability and better emissions by virtue of a more constant flame temperature.

With the Helmholtz resonator 100 attached to the conduit 102 pressure waves in the combustor volume 26 and that pass into the conduit 102 may be damped successfully to prevent resonance in the conduit 102 and undesirable combustion dynamics. In this way natural frequencies of the bleed arrangement can be prevented from causing destructive combustion dynamics and prevent combustion flame instability.

A cooling air supply feed 110 is schematically shown connecting the compressor 14 to the Helmholtz resonator 100 such that pressurised cooling air from the compressor 14 can be supplied to the Helmholtz resonator 100. A cooler 112 and a valve arrangement 114 are located on the cooling air supply feed 110 and can cool the air being supplied to the Helmholtz resonator 100. The cooler 112 may incorporate the valve arrangement 114 as an integral part.

The gas turbine engine further comprises an engine control unit (ECU) 120 and instrumentation such as a combustion dynamics probe 122 which is associated with the combustion apparatus 16 to measure any one or more of the combustor apparatus' parameters such as temperature of the combustion flame or surface temperature, pressure, pressure fluctuations, oscillations, harmonics or other dynamics or frequency. The engine control unit 120 is connected to the combustion dynamics probe 122 and the valve arrangement 114 to command the valve arrangement 114 to open and close dependent on the parameter being measured and/or used to determine a necessary change in the resonant frequency of the Helmholtz resonator 100, such as the temperature of the combustion apparatus 16. Cooling air is often supplied to instrumentation and this is particularly the case with the combustion dynamics probe 122 because it is located and extends through a base plate of the burner 30 and which is exposed to high combustion temperatures.

In this exemplary embodiment, the gas turbine engine 10 comprises an annular array of combustor apparatus 16, located evenly about the central axis 20. Each combustor apparatus 16 has at least one Helmholtz resonator 100 associated to it although more than one Helmholtz resonator 100 may be provided to each combustor apparatus 16. The at least one Helmholtz resonator 100 or the inlet 104 is located at the position of the pressure anti-node of the acoustic frequency to be attenuated.

In a further embodiment, spent cooling air used to cool the combustion dynamics probe 122 can be routed by feed pipe 124 through the cooler 112 in addition to or instead of the cooling air supplied from the compressor 14. Furthermore, the spent cooling air is actually relatively hot and could be used to quickly heat the Helmholtz resonator 100 and the feed pipe 124' bypasses the cooler 120 and instead flows directly in to the valve arrangement 114.

An alternative location of the combustion dynamics probe 122' is shown in dashed lines on FIG. 2 and where it is housed in or attached through the combustor casing 60. This radially inner part of the combustor casing 60 is known as the centre casing. The combustor casing 60 is significantly cooler than the burner 30 and within the temperature capability of the combustion dynamics probe 122' and does not require cooling.

Other gas turbine engines may comprise an annular combustor apparatus and an array of Helmholtz resonators 100 may be located around the circumference of the combustor apparatus.

Figure 3:
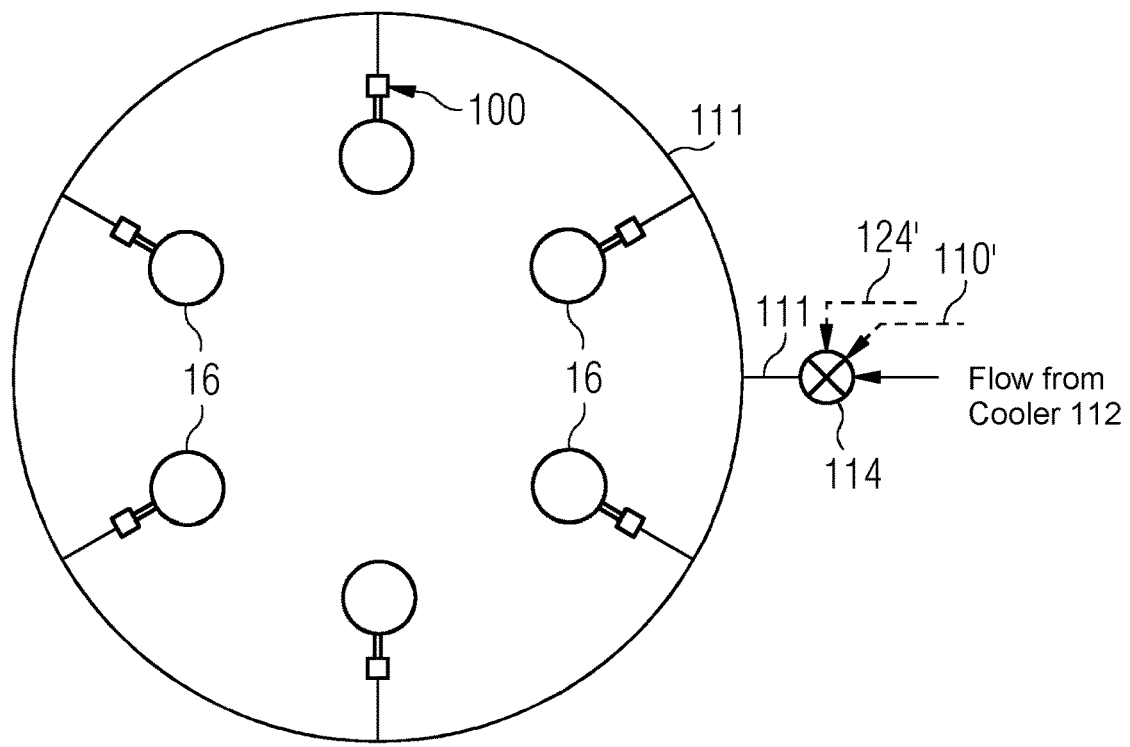
FIG. 3 is a schematic illustration of a transverse section through the gas turbine engine and showing aspects of an embodiment of the combustion apparatus and the Helmholtz resonator arrangement.

In both examples of a gas turbine engine each Helmholtz resonator 100 is connected to a single valve arrangement 114 such that each Helmholtz resonator 100 receives cooling air at the same time and the same quantity of cooling air. This is schematically shown in FIG. 3 where a delivery pipe 111 is connected between the valve arrangement 114 and at least one Helmholtz resonator 100 on each combustor 16 or spaced around an annular combustor in other examples. The feed pipe 111 surrounds at least a part of the gas turbine engine and supplies cooling air to the individual Helmholtz resonators 100. The engine control unit (ECU) 120 may receive information from one or all the combustion dynamics probes 122 and command the valve arrangement 114 to open and close dependent on the parameter being measured and/or used to determine a necessary change in the resonant frequency of the Helmholtz resonator 100. The information from more than one or all the combustion dynamics probes 122 may be averaged or even a lower/upper threshold has been reached for a specific parameter or parameters measured.

Figure 4:
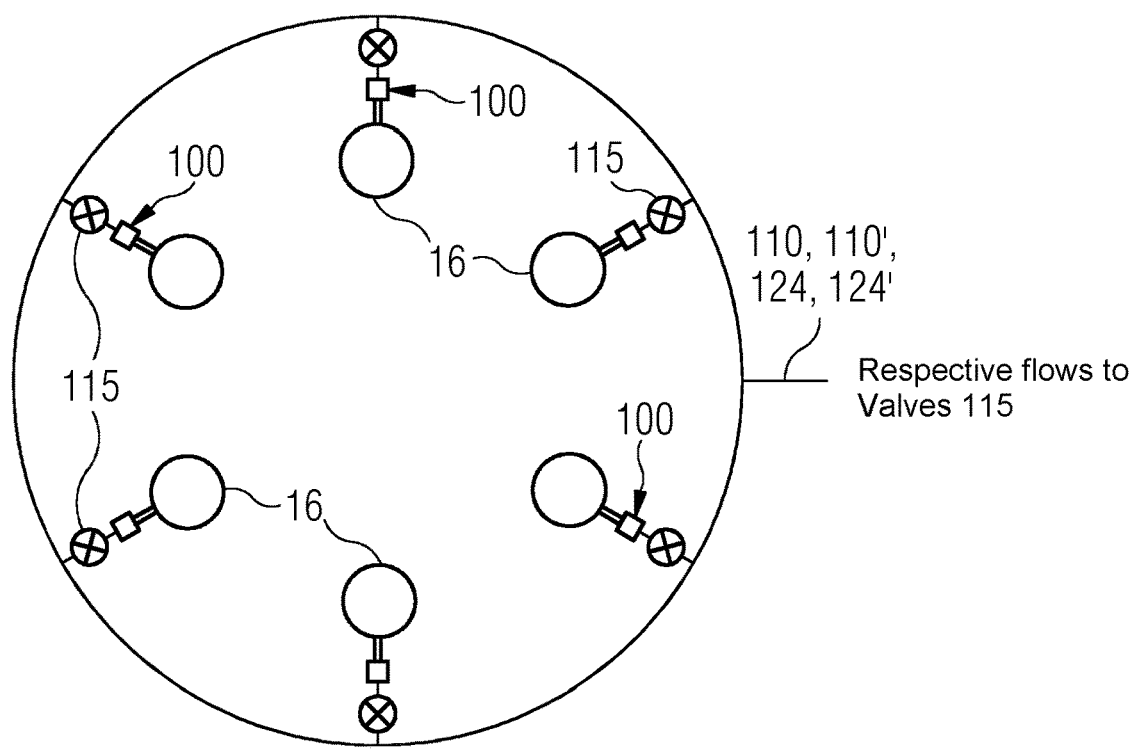
FIG. 4 is a schematic illustration of a transverse section through the gas turbine engine and showing aspects of another embodiment of the combustion apparatus and the Helmholtz resonator arrangement.

Alternatively, as shown in FIG. 4 each Helmholtz resonator 100 is connected to its own valve arrangement 114. Each valve arrangement 114, as before, is connected to the compressor 14 either directly via a cooling air supply feed 110' or the cooling air supply feed 110 via the cooler 112. Each valve arrangement 114 is further connected to the feed pipe 124 and through the cooler 112 or the feed pipe 124' which bypasses the cooler 112. Although not shown, the ECU 120 connects to all the valve arrangements 114 and the combustion dynamics probes 122. Thus cooling or heating of each Helmholtz resonator 100 may be independently achieved and therefore independently tuned to the acoustic resonant frequency of its combustion apparatus 16 or part of its annular combustor.

The Helmholtz resonator(s) 100 is generally conventional in its construction and comprises a neck 118 leading from the inlet 115 to a chamber 116. The chamber 116 defines an attenuation volume 116 which is in fluid communication with the plenum's volume 26. However, the present Helmholtz resonator 100 comprises an aperture 121 to which the cooling air supply feed 110 is connected.

As is known in the art, the geometry of the Helmholtz resonator device 100 governs the resonance frequency f of the resonator device according to the following formula:

$$f = \frac{c}{2\pi}\sqrt{\frac{S}{l'V}}$$

with the following nomenclature:
S—the cross sectional area of the neck of the resonator
V—resonator's volume
l'—the effective length of resonator's neck, which is based on the geometric neck length L2
c—the speed of sound In its broadest sense the present arrangement is such that in a first engine operating condition the valve arrangement 114 is closed and the Helmholtz resonator 100 is designed and has its geometry set to attenuate acoustic frequencies in a first range and in a second engine operating condition the valve arrangement 114 is open whereby cooling air purges the attenuation volume and the Helmholtz resonator 100 attenuates acoustic frequencies in a second range. This change of attenuation frequencies is realised by virtue of a change in temperature of the air in the Helmholtz resonator 100. During the first engine operating condition the Helmholtz resonator 100 is at a higher temperature than at the second engine operating condition. Normally the first engine operating condition is at a higher load output than the second engine operating condition although in certain transitional engine operating conditions this might not occur.

The Helmholtz resonator's 100 geometry is set by the combustor' acoustic frequency to be attenuated in the first range and where the engine is either operating for the longest duration or where the most deleterious acoustic frequency occurs. Generally, the acoustic frequency to be attenuated is between 120 Hz and 160 Hz and in one embodiment is between 132 Hz and 142 Hz with the most prevalent frequency being approximately 137 Hz. The acoustic frequency in the second engine operating condition is generally between 75 Hz and 115 Hz and in one embodiment is between 90 Hz and 100 Hz with the most prevalent frequency being approximately 95 Hz. For the present Helmholtz resonator 100 the first and second acoustic frequency ranges do not overlap. It is possible for the first and second acoustic frequency ranges to overlap, although advantageously the mid-point of each range is outside the range of the other range.

Normally during the first engine operating condition the air temperature from the compressor exit is between 590K and 790K and often in the range 640K and 730K in a specific example is approximately 690K and in the second engine operating condition the temperature is between 300K and 400K, advantageously 325K and 375K and more advantageously 350K.

Furthermore, in the first engine operating condition the engine is operating at at least 90% of its maximum output and which can be 100%. In the second engine operating condition the engine is operating between 50% and 75% of its maximum output.

The ECU 120 which receives signals from the combustion dynamics probe 122 on the operating condition (measured parameters) of the combustion apparatus 16 and calculates via an algorithm the required temperature of the Helmholtz resonator 100 and open the valve arrangement to introduce cooling air to the Helmholtz resonator 100 in order to attenuate a second or different acoustic frequency of the combustor. The algorithm may include a signal indicative of a change in the demanded output of the engine and via a known calibration of behaviours of the combustion apparatus dependent on the demanded output and command the valve arrangement 114 to open or close, partly or wholly, such that the temperature of the Helmholtz resonator 100 is adjusted gradually and quickly. In this way the Helmholtz resonator's 100 attenuation frequency can be variably adjusted during transitions between the first and second engine operating conditions.

Thus a method of operating a gas turbine engine comprising the steps of detecting a change in temperature in the combustion apparatus whereby the acoustic frequency to be attenuated at the first engine operating condition is outside the range of the Hz resonator and opening the valve arrangement 114 and supplying cooling air the Hz resonator such that it attenuates acoustic frequencies in the second range.

Although the specific description above refers to two distinct ranges of acoustic frequencies to attenuate it is also possible that other ranges of acoustic frequencies may be attenuated by adjusting the temperature of the Helmholtz resonator's volume. Indeed, according the present invention, it is possible for the temperature of the volume (chamber 116) to be incrementally or variably adjusted anywhere between two opposing temperature extremes (i.e. maximum and minimum temperatures) to gradually vary the attenuation characteristic of the Helmholtz resonator of acoustic to attenuate a broad range of engine operating conditions between maximum output and engine start-up conditions.

The invention claimed is:

1. A gas turbine engine comprising:
a combustion apparatus defining a volume,
a compressor,
a cooling air supply feed from the compressor,
a bleed arrangement comprising a conduit, the conduit is connected to the volume such that fluid can be bled from the volume through the conduit,
a Helmholtz resonator, the Helmholtz resonator comprises a neck and a chamber having an attenuation volume and which is in fluid communication with the volume,
wherein the Helmholtz resonator is connected to the conduit such that fluid in the conduit can pass therebetween,
wherein the cooling air supply feed is connected to the Helmholtz resonator and comprises a valve arrangement,
wherein the valve arrangement is configured such that, in a first engine operating condition, the valve arrangement is closed and the Helmholtz resonator attenuates acoustic frequencies in a first range of frequencies and, in a second engine operating condition, the valve arrangement is open so that cooling air is supplied into the attenuation volume of the Helmholtz resonator and the Helmholtz resonator, in response to a change in temperature caused by the cooling air supplied into the attenuation volume, attenuates acoustic frequencies in a second range of frequencies,
wherein the gas turbine engine further comprises:
a combustion dynamics probe configured to measure a temperature in the combustion apparatus,
an engine control unit,
wherein the engine control unit is connected to the combustion dynamics probe and to the valve arrangement and is configured to command the valve arrangement to open and close depending on the temperature being measured by the combustion dynamics probe,
wherein the change in the attenuation of the acoustic frequencies from the first range of frequencies to the second range of frequencies is based on the change in temperature caused by the cooling air supplied into the attenuation volume of the Helmholtz resonator during the second engine operating condition.

2. The gas turbine engine as claimed in claim 1,
wherein the first engine operating condition is at a different load output than the second engine operating condition, and/or
wherein the first engine operating condition is at a higher output than the second engine operating condition.

3. The gas turbine engine as claimed in claim 1,
wherein during the first engine operating condition the Helmholtz resonator is at a higher temperature than at the second engine operating condition.

4. The gas turbine engine as claimed in claim 1, wherein the combustion apparatus is an annular combustor apparatus or an annular array of combustor apparatus each having at least one Helmholtz resonator,
wherein each Helmholtz resonator is connected to its own valve arrangement and opened or closed independently of the other valve arrangements.

5. The gas turbine engine as claimed in claim 1, wherein the combustion apparatus is an annular combustor apparatus or an annular array of combustor apparatus each having at least one Helmholtz resonator,
wherein each Helmholtz resonator is connected to a single valve arrangement.

6. The gas turbine engine as claimed in claim 1,
wherein the cooling air supply feed comprises a cooler to cool the air supplied to the Helmholtz resonator(s).

7. The gas turbine engine as claimed in claim 1,
wherein in the first range the acoustic frequencies are between 120 Hz and 160 Hz, and wherein in the second range the acoustic frequencies are between 75 Hz and 115 Hz.

8. The gas turbine engine as claimed in claim 7,
wherein in the first range the acoustic frequencies are between 132 Hz and 142 Hz; and wherein in the second range the acoustic frequencies are between 90 Hz and 100 Hz.

9. The gas turbine engine as claimed in claim 7,
wherein in the first range the acoustic frequencies are at a point of the first range which is at approximately 137 Hz; and wherein in the second range the acoustic frequencies are at a point of the second range which is at approximately 95 Hz.

10. The gas turbine engine as claimed in claim 1,
wherein in the first engine operating condition the temperature of an exit of the compressor is between 590K and 790K, and
wherein in the second engine operating condition the temperature of the exit of the compressor is between 300K and 400K.

11. The gas turbine engine as claimed in claim 10,
wherein in the first engine operating condition the temperature of an exit of the compressor is between 640K and 730K; and
wherein and in the second engine operating condition the temperature of the exit of the compressor is between 325K and 375K.

12. The gas turbine engine as claimed in claim 10,
wherein in the first engine operating condition the temperature is approximately 690K; and
wherein in the second engine operating condition the temperature is approximately 350K.

13. The gas turbine engine as claimed in claim 1,
wherein in the first engine operating condition the engine is operating at at least 90% of its maximum output, and
wherein in the second engine operating condition the engine is operating between 50% and 75% of its maximum output.

14. The gas turbine engine as claimed in claim 1, wherein the geometry of the neck and the chamber of the Helmholtz resonator is set to attenuate acoustic frequencies in a first range.

15. The gas turbine engine as claimed in claim 1, wherein the bleed arrangement further comprises a valve and an exhaust ducting, the valve is situated between the conduit and the exhaust ducting.

16. The gas turbine engine as claimed in claim 15, wherein the exhaust ducting is connected to any one or more of an inlet of the compressor, an inlet of the gas turbine engine, an exhaust duct of the gas turbine engine.

17. A method of operating a gas turbine engine according to claim 1, the method comprising:
  detecting a change in temperature in the combustion apparatus whereby the acoustic frequency to be attenuated at the first engine operating condition is outside the range of the Helmholtz resonator; and
  opening the valve arrangement and supplying cooling air the Helmholtz resonator such that it attenuates acoustic frequencies in the second range.

18. The method of operating a gas turbine engine according to claim 17, further comprising:
  detecting a change in temperature in the combustion apparatus whereby the acoustic frequency to be attenuated at the second engine operating condition is outside the range of the Helmholtz resonator being supplied with cooling air; and
  closing the valve arrangement to reduce or stop the supply of cooling air to the Helmholtz resonator such that it attenuates acoustic frequencies in the first range.

19. The method of operating a gas turbine engine according to claim 18, the method further comprising:
  bleeding a fluid from the volume.

* * * * *